United States Patent
Shang et al.

(10) Patent No.: US 11,796,507 B2
(45) Date of Patent: Oct. 24, 2023

(54) DEVICE AND METHOD FOR DETECTING WIRE BREAKAGE

(71) Applicant: China Institute of Water Resources and Hydropower Research, Beijing (CN)

(72) Inventors: Feng Shang, Beijing (CN); Guoxin Zhang, Beijing (CN); Bo Yang, Beijing (CN); Yi Liu, Beijing (CN)

(73) Assignee: China Inst. of Water Reources & Hydropower Res., Beijing (CN)

( * ) Notice: Subject to any disclaimer, the term of this patent is extended or adjusted under 35 U.S.C. 154(b) by 0 days.

(21) Appl. No.: 17/426,768

(22) PCT Filed: Mar. 31, 2020

(86) PCT No.: PCT/CN2020/082583
§ 371 (c)(1),
(2) Date: Jul. 29, 2021

(87) PCT Pub. No.: WO2021/168986
PCT Pub. Date: Sep. 2, 2021

(65) Prior Publication Data
US 2022/0390415 A1 Dec. 8, 2022

(30) Foreign Application Priority Data
Feb. 28, 2020 (CN) .......................... 202010134251.4

(51) Int. Cl.
G01N 27/87 (2006.01)
(52) U.S. Cl.
CPC .................................... G01N 27/87 (2013.01)
(58) Field of Classification Search
CPC ................................ G01N 27/87; G01N 27/82
(Continued)

(56) References Cited

U.S. PATENT DOCUMENTS 10,012,615 B1 * 7/2018 Mergelas ............. G01N 27/902
11,499,427 B2 * 11/2022 Wang ................... E21D 11/386
(Continued)

FOREIGN PATENT DOCUMENTS

CN  108956752  12/2018
CN  109958884  7/2019
(Continued)

OTHER PUBLICATIONS

Notification to Grant Patent Right for Invention in corresponding Chinese Patent Application Serial No. 202010134251.4, dated Apr. 26, 2022 (English machine translation attached).
(Continued)

*Primary Examiner* — Christopher P McAndrew
(74) *Attorney, Agent, or Firm* — Hovey Williams LLP

(57) ABSTRACT

A device and method for detecting wire breakage are provided. The wire breakage detection device includes an excitation coil, a detection coil, and a processor. The detection signal input end of the processor is connected to the detection coil. The excitation coil and the detection coil are located on two sides of a longitudinal section of an inner wall of a to-be-detected pipeline respectively, wherein a conductive closed structure is formed continuously and annularly in the to-be-detected pipeline, the axis of the excitation coil is parallel to the axis of the to-be-detected pipeline, and the axis of the detection coil is perpendicular to the axis of the to-be-detected pipeline. The excitation coil is configured to generate an alternating magnetic field according to an alternating electromagnetic signal, wherein an induced current and an electromagnetic field of the induced current are generated by the to-be-detected pipeline located in the alternating magnetic field.

9 Claims, 6 Drawing Sheets

(58) Field of Classification Search
USPC .......................................................... 324/220
See application file for complete search history.

(56) References Cited

U.S. PATENT DOCUMENTS

| | | | | |
|---|---|---|---|---|
| 2003/0164698 | A1* | 9/2003 | Paulson | G01N 27/902 |
| | | | | 324/238 |
| 2004/0189289 | A1 | 9/2004 | Atherton | |
| 2010/0139081 | A1 | 6/2010 | Decitre et al. | |
| 2017/0148567 | A1* | 5/2017 | Rosenfeld | G01N 27/82 |
| 2018/0059060 | A1* | 3/2018 | Dusseault | G01N 33/383 |

FOREIGN PATENT DOCUMENTS

| | | | |
|---|---|---|---|
| CN | 110018228 | 7/2019 | |
| CN | 110346838 | 10/2019 | |
| CN | 109299542 | 4/2020 | |
| CN | 109506077 | 6/2020 | |
| WO | WO-2017155501 A1 * | 9/2017 | G01N 17/006 |

OTHER PUBLICATIONS

Office Action in corresponding Chinese Patent Application Serial No. 202010134251.4, dated Sep. 10, 2021 (English machine translation attached).
Office Action in corresponding Chinese Patent Application Serial No. 202010134251.4, dated Feb. 24, 2022 (English machine translation attached).
Search Report in corresponding Chinese Patent Application Serial No. 202010134251.4 (English machine translation attached).
Supplementary Search Report in corresponding Chinese Patent Application Serial No. 202010134251.4 (English machine translation attached).
International Search Report and Written Opinion in corresponding PCT/CN2020/082583, dated Nov. 26, 2020 (English translation attached).

* cited by examiner

DEVICE AND METHOD FOR DETECTING WIRE BREAKAGE

CROSS-REFERENCE TO RELATED APPLICATIONS

The present application is the U.S. National Stage of International Patent Application No. PCT/CN2020/082583, filed Mar. 31, 2020, which claims priority to Chinese Patent Application No. 202010134251.4, filed with the Chinese Patent Office on Feb. 28, 2020, entitled "Device and Method for Detecting Wire Breakage", the contents of each of which are incorporated herein by reference in its entirety.

TECHNICAL FIELD

The present disclosure relates to the technical field of water conservancy engineering and, in particular, to a device and method for detecting wire breakage.

BACKGROUND ART

In civil and hydraulic engineering structures, continuous annular closed structures are formed in or on the surface of concrete by steel bars, prestressed steel bars (steel strands, steel wires), carbon fiber reinforcements, carbon fiber cloth, or the like. These annular closed structures will be broken due to the action of external forces, earthquake damage, or environmental corrosion, which will endanger the safety of the structures.

Typical examples include, for example, prestressed concrete cylinder pipes (PCCP), prestressed concrete pipes (PCP), reinforced concrete pipes (RCP), and PCCPs, PCPs, and RCPs reinforced annularly (or circumferentially) with carbon fibers. The annular structures such as prestressed steel bars, steel bars, carbon fiber reinforcements, and carbon fiber cloth in these pipes will break, which is usually called "wire breakage".

It is a common strategy for engineering safety maintenance to regularly detect "wire breakage" and assess safety of a damaged engineering structure so as to carry out timely and appropriate reinforcement until it is discarded. In the prior art, the occurrence or non-occurrence of wire breakage is often detected by an electromagnetic induction method. However, large-area wire breakage is not detected with high accuracy in actual engineering, due to the reasons such as the coil arrangement mode, signal interpretation method, and standard signal generation method used in the prior art. The "large-area wire breakage" mentioned here refers to a wire breakage distributed by a distance longer than 1 m in the axial direction of a pipeline.

On the other hand, water delivery pipelines wound with two or more layers of prestressed steel wires are often used in engineering in order to resist deep overburden pressure. Such kind of pipeline is subjected to the combined action of water hammer and environmental corrosion, whereby the prestressed steel wires will be broken layer by layer. Usually, the outer layer of steel wire will be broken first, and harmful substances in the environment will penetrate into the position of the inner layer of steel wire, which will further induce the breakage of the inner layer of steel wire. In the prior art, wire breakages of pipelines wound with two or more layers of prestressed steel wires are not detected with high accuracy, and it is difficult to distinguish whether the wire breakage occurs in the inner layer or in the outer layer, or both layers are broken.

SUMMARY

The object of embodiments of the present disclosure includes providing a wire breakage detection device to ameliorate the technical problem of low accuracy in judging the wire breakage status in the prior art.

An embodiment of the present disclosure provides a wire breakage detection device, which is configured to detect a wire breakage status of a conductive closed structure formed continuously and annularly in a to-be-detected pipeline. The device includes an excitation coil, a detection coil, and a processor; a detection signal input end of the processor is connected to the detection coil; the excitation coil and the detection coil are located on two sides of a longitudinal section of an inner wall of the to-be-detected pipeline respectively, wherein an axis of the excitation coil is parallel to an axis of the to-be-detected pipeline, and an axis of the detection coil is perpendicular to the axis of the to-be-detected pipeline; the excitation coil is configured to generate an alternating magnetic field according to an alternating electromagnetic signal, wherein an induced current and an electromagnetic field of the induced current are generated by the to-be-detected pipeline located in the alternating magnetic field; the detection coil is configured to generate a detection signal according to the alternating magnetic field and the electromagnetic field; and the processor is configured to compare the detection signal with a standard signal and determine the wire breakage status of the conductive closed structure according to the comparison result.

In the above implementation process, the axis of the excitation coil is parallel to the axis of the to-be-detected pipeline, and the axis of the detection coil is perpendicular to the axis of the to-be-detected pipeline. The excitation coil generates an alternating magnetic field according to an alternating electromagnetic signal in a simple manner, and the detection coil provided in the to-be-detected pipeline can receive a detection signal with higher intensity, which contributes to an increase in signal-to-noise ratio, and therefore the wire breakage status can be identified with increased accuracy in the case where there are many wire breakage regions in the to-be-detected pipeline, and respective breakage of inner and outer layers of wires in a double-layer steel wire pipe can be effectively distinguished.

Optionally, the device further includes an electromagnetic signal generator which has a signal output end connected to the excitation coil; and the electromagnetic signal generator is configured to generate the alternating electromagnetic signal.

Optionally, the processor is connected to a control end of the electromagnetic signal generator; and the processor is further configured to control the electromagnetic signal generator to generate the alternating electromagnetic signal.

Optionally, the axial distance between the center of the excitation coil and the center of the detection coil is equal to a preset distance.

Optionally, the device further includes a shield which is provided between the detection coil and the excitation coil. The influence of direct coupling on the detection result can be reduced by the shield.

An embodiment of the present disclosure provides a method for detecting wire breakage, comprising: inputting an alternating electromagnetic signal to an excitation coil so that the excitation coil generates an alternating magnetic field according to the alternating electromagnetic signal, wherein the excitation coil and a detection coil are located on two sides of a longitudinal section of an inner wall of a to-be-detected pipeline respectively, wherein a conductive closed structure is formed continuously and annularly in the to-be-detected pipeline, an axis of the excitation coil is parallel to an axis of the to-be-detected pipeline, an axis of the detection coil is perpendicular to the axis of the to-be-detected pipeline, and an induced current and an electromagnetic field of the induced current are generated by the to-be-detected pipeline located in the alternating magnetic field; receiving a detection signal generated by the detection coil according to the alternating magnetic field and the electromagnetic field; and comparing the detection signal with a standard signal and determining a wire breakage status of the conductive closed structure according to the comparison result.

Optionally, before comparing the detection signal with a standard signal and determining a wire breakage status of the to-be-detected pipeline according to the comparison result, the method further includes: inputting an alternating electromagnetic signal to an excitation coil provided in a standard pipeline, wherein the excitation coil and a detection coil are located on two sides of a longitudinal section of an inner wall of the standard pipeline respectively, a conductive closed structure is formed continuously and annularly in the standard pipeline and no wire breakage occurs in the conductive closed structure, and the excitation coil and the detection coil are placed at positions in the standard pipeline consistent with those in the to-be-detected pipeline; and receiving a signal generated by the detection coil as the standard signal.

Optionally, before comparing the detection signal with a standard signal and determining a wire breakage status of the to-be-detected pipeline according to the comparison result, the method further includes: acquiring parameters of the excitation coil and the detection coil, parameters of the alternating electromagnetic signal, and parameters of the to-be-detected pipeline; constructing a simulation model of the to-be-detected pipeline according to the parameters of the to-be-detected pipeline; and performing simulation on the simulation model of the to-be-detected pipeline according to the parameters of the excitation coil and the detection coil and the parameters of the alternating electromagnetic signal, and determining the standard signal according to the simulation result.

Optionally, before inputting an alternating electromagnetic signal to an excitation coil, the method further includes: inputting different test alternating electromagnetic signals to the excitation coil provided in an experimental pipeline, wherein the excitation coil and a detection coil are located on two sides of a longitudinal section of an inner wall of the experimental pipeline respectively, a conductive closed structure is formed continuously and annularly in the experimental pipeline and a wire breakage status of the conductive closed structure is known, and the excitation coil and the detection coil are placed at positions in the experimental pipeline consistent with those in the to-be-detected pipeline; receiving a plurality of test signals generated by the detection coil; comparing the plurality of test signals with a standard signal respectively, and determining a wire breakage status of the experimental pipeline corresponding to each test signal according to the comparison result; and determining the test alternating electromagnetic signal corresponding to the test signal as the alternating electromagnetic signal to be input to the excitation coil, when the wire breakage status is the same as the wire breakage status of the experimental pipeline.

Optionally, before inputting an alternating electromagnetic signal to the excitation coil, the method further includes: determining an axial distance between a center of the excitation coil and a center of the detection coil for detecting the to-be-detected pipeline, according to a model type of the to-be-detected pipeline and a pre-established mapping relationship between a pipeline model type and an axial distance between centers of coils.

Optionally, the step of comparing the detection signal with a standard signal and determining a wire breakage status of the to-be-detected pipeline according to the comparison result includes: controlling a fixing member, on which the excitation coil and the detection coil are provided, to move axially in the to-be-detected pipeline, comparing, with the standard signal, a detection signal detected at each position to which it is moved, and determining, according to the comparison result, a wire breakage status at the position to which it is currently moved, wherein the relative positions of the excitation coil and the detection coil on the fixing member are fixed during the axial movement.

Additional features and advantages of the present disclosure will be set forth in the description which follows, and in part will be apparent from the description, or may be learned by the implementing examples of the present disclosure. The objects and additional advantages of the present disclosure may be realized and attained by means of the structures particularly pointed out in the description, the claims, and the accompanying drawings.

BRIEF DESCRIPTION OF THE DRAWINGS

In order to more clearly illustrate technical solutions of embodiments of the present disclosure, drawings required for use in the embodiments of the present disclosure will be described briefly below. It is to be understood that the drawings below are merely illustrative of some embodiments of the present disclosure, and therefore should not be considered as limiting its scope. It will be understood by those of ordinary skill in the art that other relevant drawings can also be obtained from these drawings without any inventive effort.

Figure 1:
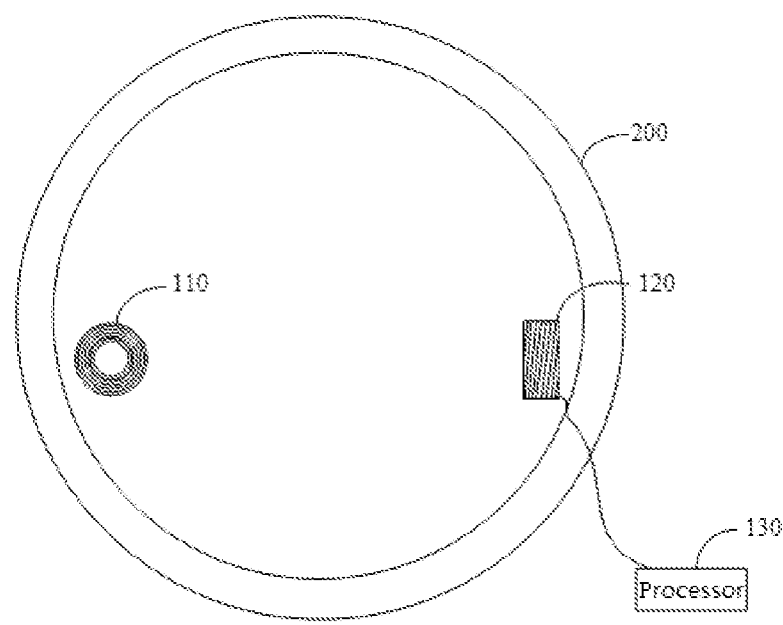
FIG. 1 is a schematic structural diagram of a wire breakage detection device according to an embodiment of the present disclosure.
Figure 2:
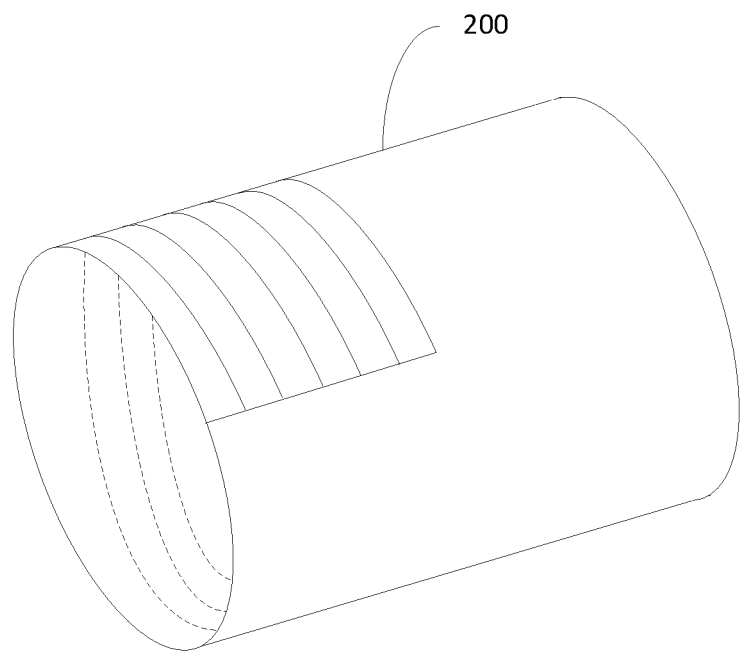
FIG. 2 is a schematic structural diagram of a to-be-detected pipeline according to an embodiment of the present disclosure.

Reference Numerals: 100: wire breakage detection device; 110: excitation coil; 120: detection coil; 130: processor; 140: electromagnetic signal generator; 150: shield; 155: working platform; 160: chassis; 170: expansion joint; 180: crossbeam; 185: support rod; 190: distance measuring wheel; 200: to-be-detected pipeline; 110: excitation coil, 120: receiving coil, 210: structural concrete inside steel cylinder; 220: structural concrete outside steel cylinder; 230: outer prestressed steel wire layer; 240: inner prestressed steel wire layer; 250: steel cylinder; 260: protective mortar layer; 270: steel spigot ring; 275: steel bell ring; 280: water-stop rubber; 290: prestressed steel wire anchor; 300: longitudinal reinforcing carbon fiber cloth; 310: annular reinforcing carbon fiber cloth; 410: curve corresponding to intact pipeline; 420: curve corresponding to wire-broken pipeline; 430: actual wire breakage region.

DETAILED DESCRIPTION OF THE EMBODIMENTS

The technical solutions of the embodiments of the present disclosure will be described below clearly and completely with reference to the accompanying drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations. Thus, the following detailed description of the embodiments of the present disclosure, as represented in the figures, is not intended to limit the scope of the present disclosure as claimed, but is merely representative of selected embodiments of the present disclosure. All the other embodiments obtained by those skilled in the art in light of the embodiments of the present disclosure without inventive efforts will fall within the scope of the present disclosure as claimed.

It should be noted that similar reference numerals and letters refer to similar items in the following figures, and thus once an item is defined in one figure, it may not be further defined or explained in the following figures. In addition, in the description of the present disclosure, the terms such as "first" and "second" are used for distinguishing the description only, and should not be understood as an indication or implication of importance in relativity.

Here, it should also be noted that only the device structures related closely to the solutions according to the present disclosure are shown in the drawings while other details less relevant to the present disclosure are omitted in order to avoid obscuring the present disclosure due to unnecessary details.

It should be understood that the present disclosure is not limited to the described implementation forms due to the following description with reference to the accompanying drawings. In this text, where feasible, the embodiments may be combined with each other, features in different embodiments may be replaced with or borrowed from each other, and one or more features may be omitted in one embodiment.

In civil and hydraulic engineering structures, continuous annular closed structures are formed in concrete by steel bars, prestressed steel bars (steel strands, steel wires), carbon fiber reinforcements, carbon fiber cloth, or the like. These annular closed structures will be broken due to the action of external forces, earthquake damage, or environmental corrosion, which will endanger the safety of the structures.

Typical examples include, for example, prestressed concrete cylinder pipes (PCCP), prestressed concrete pipes (PCP), reinforced concrete pipes (RCP), and PCCPs, PCPs, and RCPs reinforced annularly with carbon fibers. The annular structures such as prestressed steel bars, steel bars, carbon fiber reinforcements, and carbon fiber cloth in these pipes will break, which is usually called "wire breakage". The "prestressed concrete cylinder pipe" is discussed below as a typical representative.

It is a common strategy for engineering safety maintenance to regularly detect "wire breakage" and assess safety of a damaged engineering structure so as to carry out timely and appropriate reinforcement until it is discarded. In the prior art, the occurrence or non-occurrence of wire breakage is often detected by an electromagnetic induction method. However, wire breakage is not detected with high accuracy in actual engineering, due to the reasons such as the coil arrangement mode and signal interpretation (standard signal generation method) used in the prior art.

An embodiment of the present disclosure provides a wire breakage detection device, by which the above technical problems can be effectively alleviated. The wire breakage detection device according to the embodiment of the present disclosure will be described in detail below with reference to the accompanying drawings.

Figure 3:
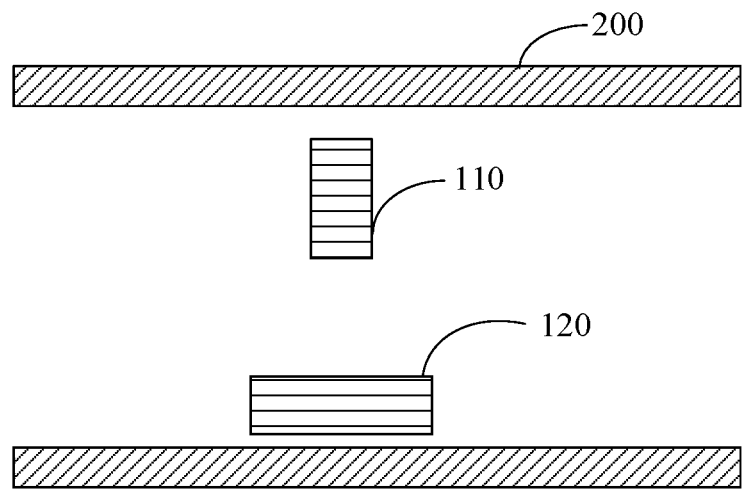
FIG. 3 is a schematic structural diagram of another wire breakage detection device according to an embodiment of the present disclosure.

Referring to FIG. 1, an embodiment of the present disclosure provides a wire breakage detection device 100 (not explicitly marked in FIG. 1), which is configured to detect a wire breakage status of a conductive closed structure formed continuously and annularly in a to-be-detected pipeline 200. The wire breakage detection device 100 includes an excitation coil 110, a detection coil 120, and a processor 130; a detection signal input end of the processor 130 is connected to the detection coil 120; and the excitation coil 110 and the detection coil 120 are located on two sides of a longitudinal section of the inner wall of the to-be-detected pipeline 200 respectively. Referring to FIG. 3, a conductive closed structure is formed continuously and annularly in the to-be-detected pipeline 200. The closed structure may be located on the inner wall of the to-be-detected pipeline 200, but it may be located on the outer wall of the to-be-detected pipeline 200 in some embodiments. The so-called wire breakage detection in the embodiment of the present disclosure refers to detection of whether the conductive closed structure is broken. The conductive closed structure may be formed of a conductive material such as metal wire, carbon fiber, conductive rubber, or conductive plastic. For example, when the to-be-detected pipeline 200 is a prestressed concrete cylinder pipe (PCCP), the annular (or circumferential)

prestressed steel wire wound around the PCCP is the conductive closed structure. It should be understood that in other types of to-be-detected pipelines 200, the conductive closed structures may not be prestressed. In addition, an axis of the excitation coil 110 (i.e., an axis perpendicular to the paper surface direction) is parallel to the axis of the to-be-detected pipeline 200, and an axis of the detection coil 120 (i.e., an axis parallel to the paper surface direction) is perpendicular to the axis of the to-be-detected pipeline 200. However, the axis of the excitation coil 110 and the axis of the detection coil 120 are not required to be perpendicularly projected on the cross section of the to-be-detected pipeline 200.

The wire breakage detection device 100 works based on the following principle: the excitation coil 110 receives an alternating electromagnetic signal, and an alternating magnetic field is generated around the excitation coil 110 according to the principle of the magnetic effect of the current when the alternating electromagnetic signal passes through the excitation coil 110. According to the principle of electromagnetic induction, the conductive closed structure formed continuously and annularly in the to-be-detected pipeline 200 generates an induced current in the alternating magnetic field, and then the induced current induces an electromagnetic field. The detection coil 120 can generate a detection signal according to the alternating magnetic field generated by the excitation coil 110 and the electromagnetic field induced by the above-mentioned induced current. If wire breakage has occurred in the to-be-detected pipeline 200, it is equivalent to a sudden change in the number of turns and impedance of the coil in the to-be-detected pipeline 200, resulting in a sudden change in the induced current in the to-be-detected pipeline 200. Consequently, the electromagnetic field generated around the to-be-detected pipeline 200 is also changed suddenly, and finally the detection signal detected by the detection coil 120 changes depending on the suddenly changed electromagnetic field. Therefore, the processor 130 compares the detection signal with a standard signal, and the wire breakage status of the to-be-detected pipeline 200 can be determined according to the comparison result. Optionally, if the comparison result obtained by the comparison indicates that the deviation between the detection signal and the standard signal is greater than or equal to a preset deviation, it can be determined that wire breakage has occurred in the to-be-detected pipeline 200, and if the comparison result indicates that the deviation between the detection signal and the standard signal is less than the preset deviation, it can be determined that no wire breakage occurs in the to-be-detected pipeline 200, where the preset deviation is determined according to the measurement and analysis accuracy of the processor 130. Here, the object to be compared mentioned above may include a relative signal amplitude and phase distribution along the axis of the pipeline. The relative signal amplitude refers to the ratio of a signal amplitude detected when the receiving coil is moved to a location of each pipeline other than its midpoint to a basic unit, where a signal amplitude measured by the receiving coil at the midpoint of the pipeline is used as the basic unit. The relative phase refers to a phase difference between the signal of the excitation coil and the signal of the receiving coil.

The values of the relative amplitude and phase of the signal detected at each point are slightly varied, because of being affected by the accuracy and stability of the signal power source, transmitting device, and receiving device and of data processing, and affected by the forward moving speed of the pipeline detection vehicle and by interference sources around the pipeline. Such variation will interfere with the judgment of the location of a wire breakage region, thereby adversely affecting the wire breakage detection accuracy.

For a specific signal detection device, a specific forward moving speed of a pipeline detection vehicle, and specific interference sources around the pipeline, an average and a variance may be calculated from relative amplitudes and phases detected in the vicinity of each point to evaluate a preset deviation in the vicinity of the point. For example, it can be set that the occurrence of wire breakage in the to-be-detected pipeline 200 can be determined when the phase difference between the detection signal and the standard signal is greater than or equal to 0.1 degree.

Furthermore, the excitation coil 110 and the detection coil 120 in the wire breakage detection device 100 may be provided on a fixing member that is axially movable in the to-be-detected pipeline 200. For example, if the fixing member is a push rod, the push rod may be manually pushed or driven by a guide rail to move in the axial direction of the to-be-detected pipeline 200. The relative positions of the excitation coil 110 and the detection coil 120 on the fixing member are fixed during the axial movement to ensure continuous generation of detection signals by the detection coil 120 during the movement, whereby a position at which a detection signal is acquired is regarded as a position at which wire breakage has occurred, when the deviation between the detection signal and the standard signal is greater than or equal to the preset deviation. The above-mentioned axial direction of the pipeline 200 refers to the length direction of the to-be-detected pipeline. It should be noted that the axial direction is not necessarily a straight linear direction. When the pipeline 200 is not a straight pipeline, the above-mentioned axial direction should be understood as a line connecting the radial centers of the pipeline 200. Furthermore, although the pipeline 200 shown in the figures is a pipeline with a circular cross-section, it should be understood that the cross-sectional shape of the pipeline 200 in practical use may be any suitable shape, and correspondingly, the shape of the fixing member may be adjusted with the cross-sectional shape of the pipeline, as long as the fixing member is enabled to move in the pipeline.

Figure 9:
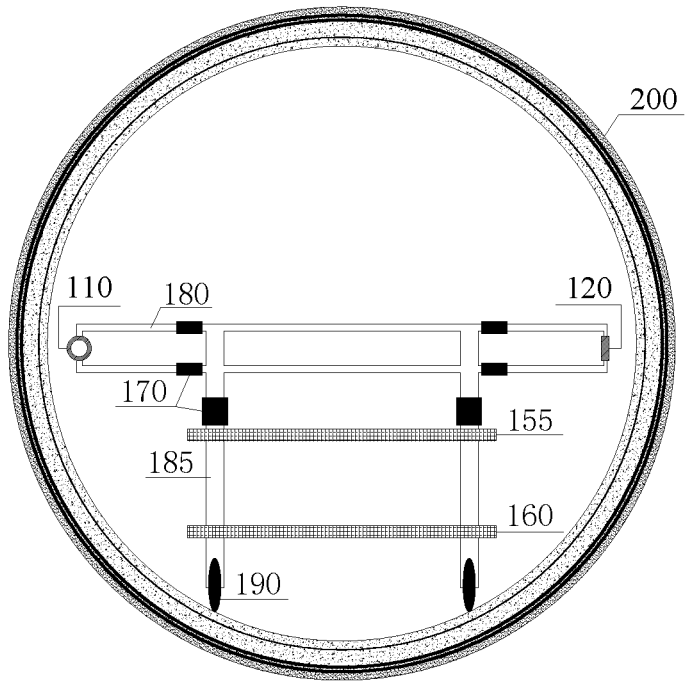
FIG. 9 is a schematic diagram of a wire breakage detection device placed in a cross section of a pipeline according to an embodiment of the present disclosure.

Referring to FIG. 9, FIG. 9 is a schematic cross-sectional diagram of the wire breakage detection device 100 according to an embodiment of the present disclosure when it is placed in a to-be-detected pipeline 200 for measurement. It can be seen from the figure that the axis of the excitation coil 110 is parallel to the length direction of the to-be-detected pipeline 200, and the axis of the detection coil 120 is perpendicular to the length direction of the to-be-detected pipeline 200. Here, the above-mentioned fixing member is a wheeled vehicle, and the excitation coil 110 and the detection coil 120 may be provided on the vehicle in a suspended manner to facilitate its smooth and stable movement in the length direction of the to-be-detected pipeline 200. The above-mentioned vehicle includes a working platform 155, a chassis 160, and one or more pairs of distance measuring wheels 190, wherein the working platform 155 is fixedly provided on the chassis 160 by means of support rods 185, a crossbeam 180 is fixedly provided on the working platform 155 and the crossbeam 180 is further provided with a plurality of expansion joints 170. Optionally, the excitation coil 110 and the detection coil 120 are provided at the two ends of the crossbeam 180, respectively.

Here, the standard signal is a signal generated by the detection coil 120 in a pipeline with no broken wires. In an embodiment of the present disclosure, the standard signal may be determined in various manners, including, but not limited to, the following manners:

In the first manner, the standard signal is determined by testing a standard pipeline in which no wire breakage occurs. Optionally, an alternating electromagnetic signal is input to an excitation coil 110 provided in a standard pipeline, wherein the excitation coil 110 and a detection coil 120 are located on two sides of a longitudinal section of the inner wall of the standard pipeline respectively, a conductive closed structure is formed continuously and annularly in the standard pipeline and no wire breakage occurs in the conductive closed structure, and the excitation coil 110 and the detection coil 120 are placed at positions in the standard pipeline consistent with those in the to-be-detected pipeline 200; and a signal generated by the detection coil 120 is received as the standard signal. It should be understood that the excitation coil 110 and the detection coil 120 for determining the standard signal here may be the excitation coil 110 and the detection coil 120 in the wire breakage detection device 100, or coils with the same specifications as the excitation coil 110 and the detection coil 120. In addition, the standard pipeline here refers to a pipeline with the same specifications and parameters as the to-be-detected pipeline.

In the second manner, the standard signal is determined by performing analog simulation on the to-be-detected pipeline 200. Optionally, the parameters of the excitation coil 110 and the detection coil 120, the parameters of the alternating electromagnetic signal, and the parameters of the to-be-detected pipeline 200 may be acquired first; a simulation model of the to-be-detected pipeline 200 is constructed according to the parameters of the to-be-detected pipeline 200; the simulation model of the to-be-detected pipeline 200 is simulated according to the parameters of the excitation coil 110 and the detection coil 120 and the parameters of the alternating electromagnetic signal, and the standard signal is determined according to the simulation result.

Here, the above-mentioned signal simulation may be implemented by using various conventional modeling and simulation tools in the art, for example, general commercial software such as ANSYS MAXWELL and COMSOL. Furthermore, the above-mentioned signal simulation may be implemented by using a professional electromagnetic field simulation program written for a specific structure, which will not be described in detail here. In addition, in an embodiment of the present disclosure, the sensitivity of the wire breakage detection method (i.e., the voltage amplitude and phase changes corresponding to the open circuit of a single closed conductive loop in the to-be-detected pipeline 200) can be adjusted in a variety of ways. The adjustment of the sensitivity allows the measured amplitude and phase changes to significantly exceed an integer multiple of the minimum resolution of the measurement system, so as to accurately identify the number of broken wires. Several modes for adjusting the sensitivity in detection of wire breakage will be described below.

In the first adjustment mode, the alternating electromagnetic signal is changed, for example, the frequency or amplitude of the alternating electromagnetic signal is changed.

In order to impart the wire breakage detection device 100 with appropriate sensitivity, an embodiment of the present disclosure provides the following method for determining the alternating electromagnetic signal: inputting different test alternating electromagnetic signals to an excitation coil 110 provided in an experimental pipeline, wherein the excitation coil 110 and a detection coil 120 are located on two sides of a longitudinal section of the inner wall of the experimental pipeline respectively, a conductive closed structure is formed continuously and annularly in the experimental pipeline and a wire breakage status of the conductive closed structure is known, and the excitation coil 110 and the detection coil 120 are placed at positions in the experimental pipeline consistent with those in the to-be-detected pipeline 200; receiving a plurality of test signals generated by the detection coil 120; comparing the plurality of test signals with a standard signal respectively, and determining a wire breakage status of the experimental pipeline corresponding to each test signal according to the comparison result; and determining the test alternating electromagnetic signal corresponding to the test signal as the alternating electromagnetic signal to be input to the excitation coil 110, when the wire breakage status is the same as the wire breakage status of the experimental pipeline. It should be understood that the excitation coil 110 and the detection coil 120 for determining the alternating electromagnetic signal here may be the excitation coil 110 and the detection coil 120 in the wire breakage detection device 100, or coils with the same specifications as the excitation coil 110 and the detection coil 120.

In the second adjustment mode, an axial distance between the center of the excitation coil 110 and the center of the detection coil 120 is changed.

In order to impart the wire breakage detection device 100 with appropriate sensitivity, an embodiment of the present disclosure provides the following method for determining the axial distance between the center of the excitation coil 110 and the center of the detection coil 120. Specifically, the axial distance between the center of the excitation coil 110 and the center of the detection coil 120 for detecting the to-be-detected pipeline 200 is determined according to a model type of the to-be-detected pipeline 200 and a pre-established mapping relationship between the pipeline model type and the axial distance between the centers of coils. Optionally, an excitation coil 110 and a detection coil 120 may be provided in an experimental pipeline, the same test alternating electromagnetic signal is input to the excitation coil 110 provided in the experimental pipeline, a plurality of corresponding test signals generated by the detection coil 120 are acquired by changing the axial distance between the center of the excitation coil 110 and the center of the detection coil 120, and a mapping relationship is established between the respective different axial distances from the center of the excitation coil 110 to the center of the detection coil 120 and the corresponding test signals.

Figure 4:
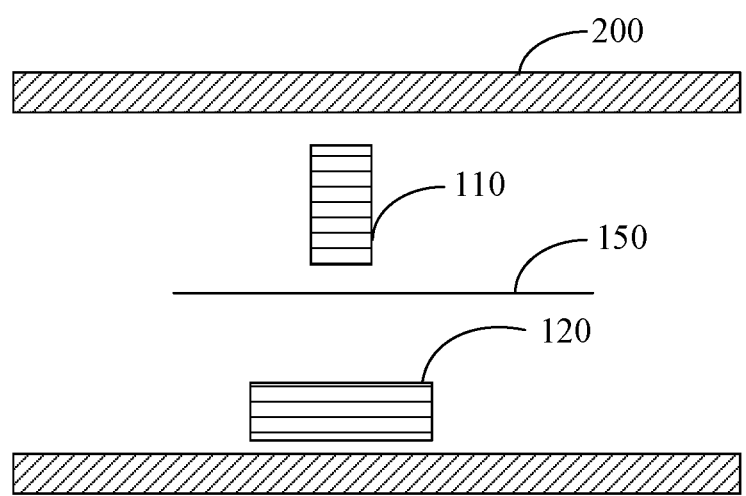
FIG. 4 is a schematic structural diagram of another wire breakage detection device according to an embodiment of the present disclosure.

In the third adjustment mode, a shield 150 is added or removed. The wire breakage detection device 100 may include a shield 150. Referring to FIG. 4, the shield 150 is provided between the detection coil 120 and the excitation coil 110. Moreover, the shield 150 may be positioned close to the detection coil 120 or close to the excitation coil 110, and the influence of direct coupling on the detection result can be reduced by the shield 150. In order to determine whether it is necessary to provide a shield 150 to adjust the sensitivity in detection of wire breakage, a test signal and a first wire breakage test result corresponding to the test signal may be acquired first when the shield 150 is provided, and then a test signal and a second wire breakage test result corresponding to the test signal may be acquired when no shield 150 is provided, the first test result and the second test result are compared to judge which case has higher resolution accuracy corresponding to the actual wire breakage status, and the addition or removal of the shield 150 is determined according to the case with higher resolution accuracy. Here, although one shield 150 is shown in the figure, it should be understood that the number and positions of shields 150 may be adjusted according to the requirements of the actual detection environments in practical use. Here, the shield 150 may be selected from a thin plate made of a material with high magnetic permeability, and the thin plate may be multilayered and in the form of a grid-like structure. It should be noted that the above-mentioned shield 150 is not essential, and the use or non-use of the shield 150 may be selected according to the specific situation of an application scenario in practical use.

Figure 6A:
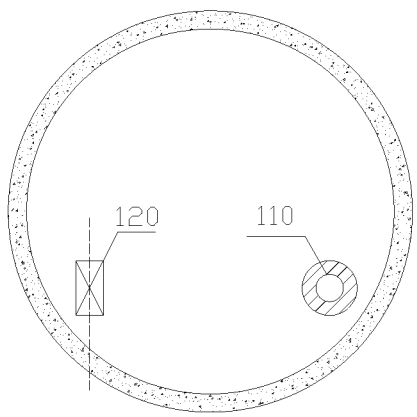
FIG. 6a is a schematic structural diagram of another wire breakage detection device according to an embodiment of the present disclosure.
Figure 6B:
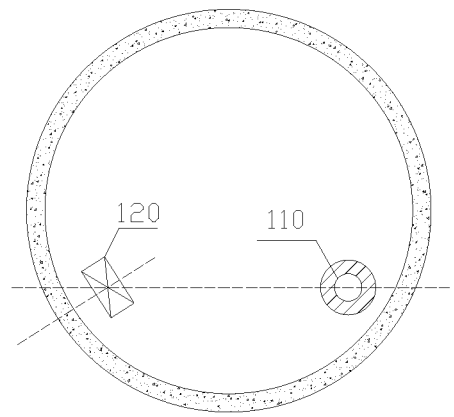
FIG. 6b is a schematic structural diagram of another wire breakage detection device according to an embodiment of the present disclosure.
Figure 7A:
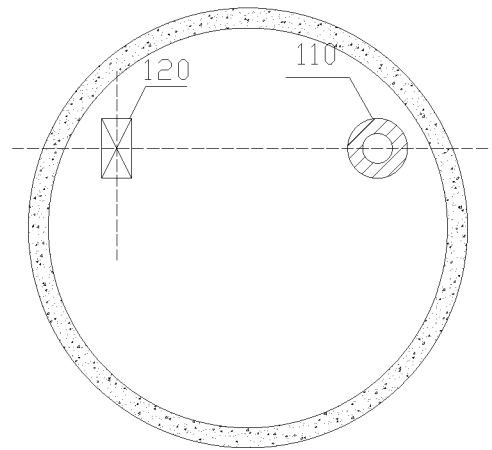
FIG. 7a is a schematic structural diagram of another wire breakage detection device according to an embodiment of the present disclosure.
Figure 7B:
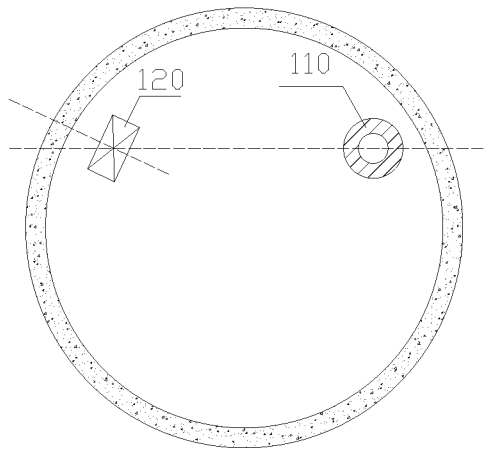
FIG. 7b is a schematic structural diagram of another wire breakage detection device according to an embodiment of the present disclosure.

In the fourth adjustment mode, an included angle formed between the axis of the detection coil 120 and a line connecting the center of the detection coil 120 and the center of the excitation coil 110 is adjusted. The axis of the detection coil 120 and the line connecting the center of the detection coil 120 and the center of the excitation coil 110 may be parallel to each other as shown in FIG. 6a and FIG. 7a, or may form an included angle as shown in FIG. 6b and FIG. 7b. Since the detection signal detected by the detection coil 120 mainly comes from an indirect coupling signal that passes twice through the pipe wall of the to-be-detected pipeline 200 and returns to the inside of the pipeline, the signal sensitivity is highest when the axis of the detection coil 120 is parallel to a direction normal to the pipe wall, but the detection signal received might not have the highest signal intensity. Therefore, the signal intensity of the detection signal received by the detection coil 120 can be adjusted by the above-mentioned included angle to adjust the appropriate sensitivity.

It should be noted that the four modes for adjusting the sensitivity in detection of wire breakage described above may be used alone in practical applications, or may be used in combination to obtain the optimal adjustment effect. The numbering of the respective adjustment modes is only exemplary and does not represent the priority order of their selection.

Figure 11:
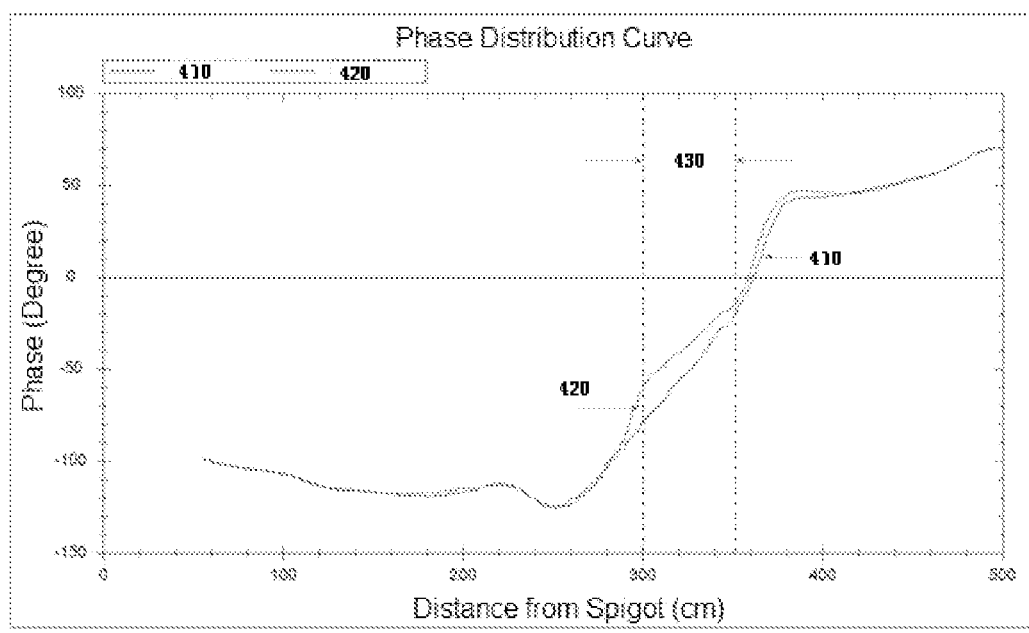
FIG. 11 is a diagram of a result of detection of a pipeline wound with two layers of prestressed steel wires obtained by using a wire breakage detection device according to an embodiment of the present disclosure.

Referring to FIG. 11, FIG. 11 is a diagram of a result of detection of a pipeline 200 wound with two layers of prestressed steel wires obtained by using a wire breakage detection device 100 according to an embodiment of the present disclosure, wherein the abscissa in the figure represents a distance from a measurement position to a spigot attached to the to-be-detected pipeline 200, and the ordinate in the figure represents phases of a test signal and a standard signal acting as a reference, wherein the lower curve 410 corresponds to an intact pipeline (i.e., the standard signal), and the upper curve 420 corresponds to a wire-broken pipeline (i.e., the test signal). It can be seen from the figure that the dotted region 430 shows a significant phase difference between the test signal and the standard signal, thus it can be judged that a situation of wire breakage has occurred in the region.

Figure 5:
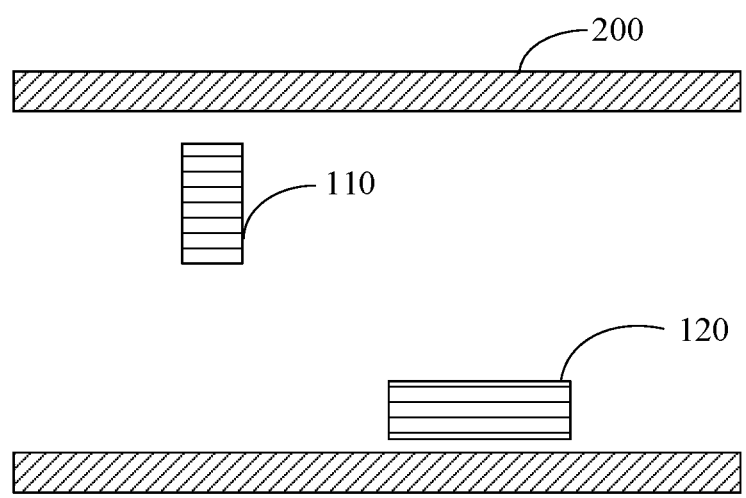
FIG. 5 is a schematic structural diagram of another wire breakage detection device according to an embodiment of the present disclosure.

Furthermore, in an embodiment of the present disclosure, the center of the excitation coil 110 and the center of the detection coil 120 may be located in the same cross section of the to-be-detected pipeline 200 (as shown in FIG. 3), or may be located in different cross sections (as shown in FIG. 5). Here, when the centers of the excitation coil 110 and the detection coil 120 are located in different cross sections of the to-be-detected pipeline 200, a larger detection range can be obtained in the to-be-detected pipeline 200, so that the wire breakage detection device 100 according to the present disclosure is more flexible in detection, and an operator can set the relative positions of the excitation coil 110 and the detection coil 120 according to his/her different detection requirements.

In the above solution, the axis of the excitation coil 110 is parallel to the axis of the to-be-detected pipeline 200, and the axis of the detection coil 120 is perpendicular to the axis of the to-be-detected pipeline 200. The excitation coil 110 generates an alternating magnetic field according to an alternating electromagnetic signal in a simple direction, and the detection coil 120 provided in the to-be-detected pipeline 200 can receive a detection signal with higher intensity, which contributes to an increase in signal-to-noise ratio, and therefore the wire breakage status can be identified with increased accuracy in the case where there are many wire breakage regions in the to-be-detected pipeline 200.

Figure 8:
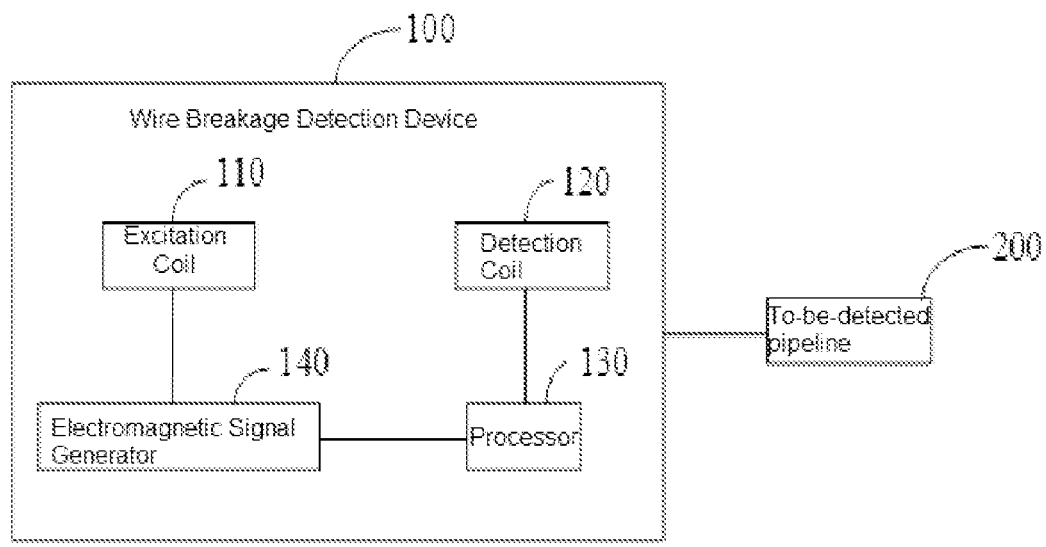
FIG. 8 is a schematic structural diagram of another wire breakage detection device according to an embodiment of the present disclosure.

Referring to FIG. 8, an electromagnetic signal generator 140 may be integrated in the wire breakage detection device 100. The signal output end of the electromagnetic signal generator 140 is electrically connected to the excitation coil 110; and the electromagnetic signal generator 140 is configured to generate an alternating electromagnetic signal. For example, the electromagnetic signal generator 140 may be a standard DDS sinusoidal signal generator with an output voltage of 20-40 V and a frequency of 30-80 Hz. Here, the electromagnetic signal generator 140 may be directly manually switched on to generate an alternating electromagnetic signal, or the electromagnetic signal generator 140 may be controlled by the processor 130 to generate an alternating electromagnetic signal. In the latter case, the processor 130 is electrically connected to a control end of the electromagnetic signal generator 140; and the processor 130 controls the electromagnetic signal generator 140 to generate an alternating electromagnetic signal. The alternating electromagnetic signal may be a sinusoidal signal or a cosinusoidal signal, and the alternating electromagnetic signal has a stable amplitude and frequency.

It should be understood that the wire breakage detection device 100 may not be integrated with an electromagnetic signal generator 140, but instead receives an alternating electromagnetic signal from an external electromagnetic signal generator 140.

As an implementable manner, the wire breakage detection device 100 further includes a memory which is configured to store the standard signal and the detection signal generated by the detection coil 120; and the processor 130 is specifically configured to acquire the standard signal and the detection signal from the memory, and acquire the wire breakage status of the to-be-detected pipeline 200 according to the detection signal and the standard signal. In this embodiment, the detection signal is stored in the memory, and then the processor 130 reads and processes the detection signal from the memory, which can alleviate the calculation burden on the processor 130. In addition, the processor 130 may also store the processing result in the memory.

Optionally, the wire breakage detection device 100 may further include a display which is electrically connected to the processor 130. When the processor 130 obtains the processing result, the processing result is displayed on the display so that the worker can intuitively view the final detection result. Here, the display may not be integrated in the wire breakage detection device 100, but is remotely connected to the wire breakage detection device 100 so as to enable a remote judgment of the wire breakage detection result.

Figure 10:
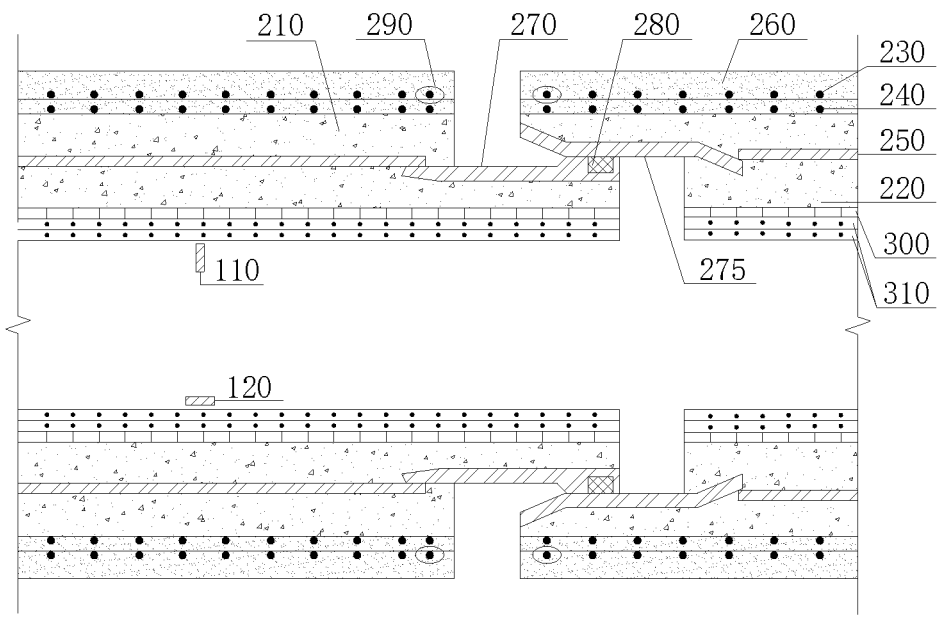
FIG. 10 is a schematic structural diagram of a pipeline wound with two layers of pressed steel wires and reinforced with carbon fiber cloth according to an embodiment of the present disclosure.

Optionally, the device may further include a communication module which is electrically connected to the processor 130. After the processor 130 obtains the processing result, the processing result may be sent to a remote user terminal via the communication module to enable remote viewing of the detection result or an operation of storing the detection result. The communication module may be a wireless communication module or a wired communication module. Here, when the module is a wireless communication module, the wireless communication module may optionally be selected from various suitable communication modules in the prior art and may communicate with a remote client terminal via a mobile communication network using protocols such as TDM and FSK, or using common protocols in the field of the Internet of Things (IoT), such as Zigbee, Bluetooth, etc. It should be noted that for the sake of easy description, each pipeline is regarded as a pipeline with a simple structure and its specific structure is not shown in detail in the description and drawings of the present disclosure. It can be understood that as shown in FIG. 10, in an actual engineering project, each pipeline actually has a multilayered structure of different materials, including structural concrete 210 inside a steel cylinder, a steel cylinder 250, structural concrete 220 outside the steel cylinder, an outer prestressed steel wire layer 230, an inner prestressed steel wire layer 240, a protective mortar layer 260, longitudinal reinforcing carbon fiber cloth 300, annular reinforcing carbon fiber cloth 310, etc. Furthermore, the pipeline may further be provided with various components, such as a steel spigot ring 270, a steel bell ring 275, a water-stop rubber 280, a prestressed steel wire anchor 290, etc., which will not be individually described in detail here. It should be understood by those skilled in the art that the "pipeline" described herein includes various concrete pipes commonly used in engineering, which are not individually listed here.

Figure 12:
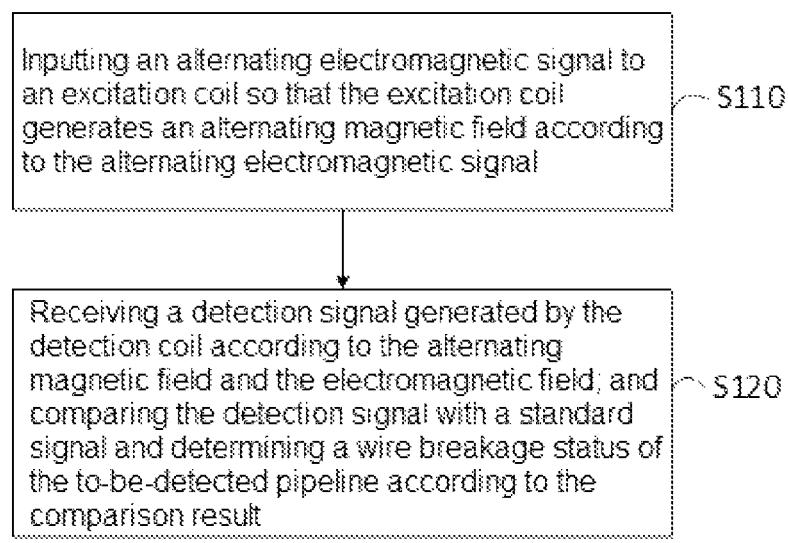
FIG. 12 is a flowchart of a method for detecting wire breakage according to an embodiment of the present disclosure.

Based on the same inventive concept, the present disclosure further provides a method for detecting wire breakage. Referring to FIG. 12, the method includes the following steps:

Step S110: inputting an alternating electromagnetic signal to an excitation coil so that the excitation coil generates an alternating magnetic field according to the alternating electromagnetic signal, wherein the excitation coil and a detection coil are located on two sides of a longitudinal section of an inner wall of a to-be-detected pipeline respectively, wherein a conductive closed structure is formed continuously and annularly in the to-be-detected pipeline, an axis of the excitation coil is parallel to an axis of the to-be-detected pipeline, an axis of the detection coil is perpendicular to the axis of the to-be-detected pipeline, and an induced current and an electromagnetic field of the induced current are generated by the to-be-detected pipeline located in the alternating magnetic field; and Step S120: receiving a detection signal generated by the detection coil according to the alternating magnetic field and the electromagnetic field; and comparing the detection signal with a standard signal and determining a wire breakage status of the to-be-detected pipeline according to the comparison result.

Optionally, before comparing the detection signal with a standard signal and determining a wire breakage status of the to-be-detected pipeline according to the comparison result, the method further includes:

inputting an alternating electromagnetic signal to an excitation coil provided in a standard pipeline, wherein the excitation coil and a detection coil are located on two sides of a longitudinal section of an inner wall of the standard pipeline respectively, a conductive closed structure is formed continuously and annularly in the standard pipeline and no wire breakage occurs in the conductive closed structure, and the excitation coil and the detection coil are placed at positions in the standard pipeline consistent with those in the to-be-detected pipeline; and receiving a signal generated by the detection coil as the standard signal.

Optionally, before comparing the detection signal with a standard signal and determining a wire breakage status of the to-be-detected pipeline according to the comparison result, the method further includes:

acquiring parameters of the excitation coil and the detection coil, parameters of the alternating electromagnetic signal, and parameters of the to-be-detected pipeline;

constructing a simulation model of the to-be-detected pipeline according to the parameters of the to-be-detected pipeline; and performing simulation on the simulation model of the to-be-detected pipeline according to the parameters of the excitation coil and the detection coil and the parameters of the alternating electromagnetic signal, and determining the standard signal according to the simulation result.

Optionally, before inputting an alternating electromagnetic signal to an excitation coil, the method further includes:

inputting different test alternating electromagnetic signals to the excitation coil provided in an experimental pipeline, wherein the excitation coil and a detection coil are located on two sides of a longitudinal section of an inner wall of the experimental pipeline respectively, a conductive closed structure is formed continuously and annularly in the experimental pipeline and a wire breakage status of the conductive closed structure is known, and the excitation coil and the detection coil are placed at positions in the experimental pipeline consistent with those in the to-be-detected pipeline;

receiving a plurality of test signals generated by the detection coil;

comparing the plurality of test signals with a standard signal respectively, and determining a wire breakage status of the experimental pipeline corresponding to each test signal according to the comparison result; and determining the test alternating electromagnetic signal corresponding to the test signal as the alternating electromagnetic signal to be input to the excitation coil, when the wire breakage status is the same as the wire breakage status of the experimental pipeline.

Optionally, before inputting an alternating electromagnetic signal to an excitation coil, the method further includes: determining an axial distance between the center of the excitation coil and the center of the detection coil for detecting the to-be-detected pipeline, according to a model type of the to-be-detected pipeline and a pre-established mapping relationship between a pipeline model type and an axial distance between centers of coils.

Optionally, the step of comparing the detection signal with a standard signal and determining a wire breakage status of the to-be-detected pipeline according to the comparison result includes:

controlling a fixing member, on which the excitation coil and the detection coil are provided, to move axially in the to-be-detected pipeline, comparing, with the standard signal, a detection signal detected at each position to which it is moved, and determining, according to the comparison result, a wire breakage status at the position to which it is currently moved, wherein the relative positions of the excitation coil and the detection coil on the fixing member are fixed during the axial movement.

In summary, the present disclosure provides a device and method for detecting wire breakage. The device includes an excitation coil, a detection coil, and a processor; the detection signal input end of the processor is connected to the detection coil; the excitation coil and the detection coil are located at the inner wall of the to-be-detected pipeline, wherein the to-be-detected pipeline is wound with prestressed metal wires, the axis of the excitation coil is parallel to the axis of the to-be-detected pipeline, and the axis of the detection coil is perpendicular to the axis of the to-be-detected pipeline; the excitation coil is configured to generate an alternating magnetic field according to an alternating electromagnetic signal, wherein an induced current and an electromagnetic field of the induced current are generated by the to-be-detected pipeline located in the alternating magnetic field; the detection coil is configured to generate a detection signal according to the alternating magnetic field and the electromagnetic field; and the processor is configured to acquire a wire breakage status of the to-be-detected pipeline according to the detection signal and a standard signal. The axis of the excitation coil is parallel to the axis of the to-be-detected pipeline, and the axis of the detection coil is perpendicular to the axis of the to-be-detected pipeline. The excitation coil generates an alternating magnetic field according to an alternating electromagnetic signal in a simple manner, and the detection coil provided in the to-be-detected pipeline can receive a detection signal with higher intensity, which contributes to an increase in signal-to-noise ratio, and therefore the wire breakage status can be identified with increased accuracy in the case where there are many wire breakage regions in the to-be-detected pipeline.

In this text, relationship terms such as first, second, and the like are used only for distinguishing one entity or operation from another entity or operation, while it is not necessarily required or implied that these entities or operations have any such practical relationship or order.

The above description is merely illustrative of the embodiments of the present disclosure and is not intended to limit the scope of protection of the present disclosure. It will be understood by those skilled in the art that various modifications and variations may be made to the present disclosure. Any modifications, equivalent alternatives, improvements and so on made within the spirit and principle of the present disclosure are intended to be encompassed within the scope of protection of the present disclosure.

INDUSTRIAL APPLICABILITY

The present disclosure provides a wire breakage detection device, which can effectively ameliorate the technical problem of low accuracy in judging the wire breakage status in the prior art.

What is claimed is:

1. A method for detecting wire breakage, comprising:
   inputting an alternating electromagnetic signal to an excitation coil so that the excitation coil generates an alternating magnetic field according to the alternating electromagnetic signal, wherein the excitation coil and a detection coil are located on two sides of a longitudinal section of an inner wall of a to-be-detected pipeline, respectively, wherein a conductive closed structure is formed continuously and annularly in the to-be-detected pipeline, an axis of the excitation coil is parallel to an axis of the to-be-detected pipeline, an axis of the detection coil is perpendicular to the axis of the to-be-detected pipeline, the axis of the detection coil and a line connecting a center of the detection coil and a center of the excitation coil form an included angle, the center of the excitation coil and the center of the detection coil are respectively located in any cross sections of the to-be-detected pipeline, and an induced current and an electromagnetic field of the induced current are generated by the to-be-detected pipeline located in the alternating magnetic field;
   receiving a detection signal generated by the detection coil according to the alternating magnetic field and the electromagnetic field; and
   comparing the detection signal with a standard signal and determining a wire breakage status of the conductive closed structure according to a comparison result,
   the method further comprising, before comparing the detection signal with a standard signal and determining a wire breakage status of the to-be-detected pipeline according to a comparison result, acquiring parameters of the excitation coil and the detection coil, parameters of the alternating electromagnetic signal, and parameters of the to-be-detected pipeline;
   constructing a simulation model of the to-be-detected pipeline according to the parameters of the to-be-detected pipeline; and
   performing simulation on the simulation model of the to-be-detected pipeline according to the parameters of the excitation coil and the detection coil and the parameters of the alternating electromagnetic signal, and determining the standard signal according to a simulation result.

2. The method according to claim 1, further comprising, before comparing the detection signal with a standard signal and determining a wire breakage status of the to-be-detected pipeline according to a comparison result,
   inputting an alternating electromagnetic signal to an excitation coil provided in a standard pipeline, wherein the excitation coil and a detection coil are located on two sides of a longitudinal section of an inner wall of the standard pipeline, respectively, a conductive closed structure is formed continuously and annularly in the standard pipeline and no wire breakage occurs in the conductive closed structure, and the excitation coil and the detection coil are placed at positions in the standard pipeline consistent with those in the to-be-detected pipeline; and
   receiving a signal generated by the detection coil as the standard signal.

3. The method according to claim 1, further comprising, before inputting an alternating electromagnetic signal to an excitation coil,
   inputting different test alternating electromagnetic signals to an excitation coil provided in an experimental pipeline, wherein the excitation coil and a detection coil are located on two sides of a longitudinal section of an inner wall of the experimental pipeline, respectively, a conductive closed structure is formed continuously and annularly in the experimental pipeline and a wire breakage status of the conductive closed structure is known, and the excitation coil and the detection coil are placed at positions in the experimental pipeline consistent with those in the to-be-detected pipeline;
   receiving a plurality of test signals generated by the detection coil;
   comparing the plurality of test signals with the standard signal, respectively, and determining a wire breakage status of the experimental pipeline corresponding to each test signal according to a comparison result; and determining a test alternating electromagnetic signal corresponding to the test signal as the alternating electromagnetic signal to be input to the excitation coil, when the wire breakage status is same as the wire breakage status of the experimental pipeline.

4. The method according to claim 1, further comprising, before inputting an alternating electromagnetic signal to an excitation coil,
determining an axial distance between a center of the excitation coil and a center of the detection coil for detecting the to-be-detected pipeline, according to a model type of the to-be-detected pipeline and a pre-established mapping relationship between a pipeline model type and an axial distance between centers of coils.

5. The method according to claim 1, wherein the comparing the detection signal with a standard signal and determining a wire breakage status of the to-be-detected pipeline according to a comparison result comprises:
controlling a fixing member, on which the excitation coil and the detection coil are provided, to move axially in the to-be-detected pipeline, comparing, with the standard signal, a detection signal detected at each position to which the fixing member is moved, and determining, according to a comparison result, a wire breakage status at a position to which the fixing member is currently moved, wherein relative positions of the excitation coil and the detection coil on the fixing member are fixed during the axial movement.

6. The method according to claim 2, wherein the comparing the detection signal with a standard signal and determining a wire breakage status of the to-be-detected pipeline according to a comparison result comprises:
controlling a fixing member, on which the excitation coil and the detection coil are provided, to move axially in the to-be-detected pipeline, comparing, with the standard signal, a detection signal detected at each position to which the fixing member is moved, and determining, according to a comparison result, a wire breakage status at a position to which the fixing member is currently moved, wherein relative positions of the excitation coil and the detection coil on the fixing member are fixed during the axial movement.

7. The method according to claim 2, wherein the comparing the detection signal with a standard signal and determining a wire breakage status of the to-be-detected pipeline according to a comparison result comprises:
controlling a fixing member, on which the excitation coil and the detection coil are provided, to move axially in the to-be-detected pipeline, comparing, with the standard signal, a detection signal detected at each position to which the fixing member is moved, and determining, according to a comparison result, a wire breakage status at a position to which the fixing member is currently moved, wherein relative positions of the excitation coil and the detection coil on the fixing member are fixed during the axial movement.

8. The method according to claim 3, wherein the comparing the detection signal with a standard signal and determining a wire breakage status of the to-be-detected pipeline according to a comparison result comprises:
controlling a fixing member, on which the excitation coil and the detection coil are provided, to move axially in the to-be-detected pipeline, comparing, with the standard signal, a detection signal detected at each position to which the fixing member is moved, and determining, according to a comparison result, a wire breakage status at a position to which the fixing member is currently moved, wherein relative positions of the excitation coil and the detection coil on the fixing member are fixed during the axial movement.

9. The method according to claim 4, wherein the comparing the detection signal with a standard signal and determining a wire breakage status of the to-be-detected pipeline according to a comparison result comprises:
controlling a fixing member, on which the excitation coil and the detection coil are provided, to move axially in the to-be-detected pipeline, comparing, with the standard signal, a detection signal detected at each position to which the fixing member is moved, and determining, according to a comparison result, a wire breakage status at a position to which the fixing member is currently moved, wherein relative positions of the excitation coil and the detection coil on the fixing member are fixed during the axial movement.

* * * * *